United States Patent
Ito (10) Patent No.: US 6,820,155 B1
(45) Date of Patent: Nov. 16, 2004

(54) INTERRUPTION MANAGING DEVICE AND INTERRUPTION MANAGING METHOD

(75) Inventor: Hiroyuki Ito, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 430 days.

(21) Appl. No.: 09/890,940

(22) PCT Filed: Dec. 7, 2000

(86) PCT No.: PCT/JP00/08661

§ 371 (c)(1),
(2), (4) Date: Aug. 7, 2001

(87) PCT Pub. No.: WO01/42918

PCT Pub. Date: Jun. 14, 2001

(30) Foreign Application Priority Data

Dec. 7, 1999 (JP) .......................................... 11-347294

(51) Int. Cl.[7] ............................................... G06F 9/48
(52) U.S. Cl. ..................................... 710/262; 710/260
(58) Field of Search ................................ 710/260, 261, 710/262, 264

(56) References Cited

U.S. PATENT DOCUMENTS 5,768,599 A * 6/1998 Yokomizo .................... 710/262
5,875,341 A * 2/1999 Blank et al. ................. 710/262
5,995,745 A * 11/1999 Yodaiken ..................... 710/262
6,499,078 B1 * 12/2002 Beckert et al. .............. 710/262
6,633,942 B1 * 10/2003 Balasubramanian ........ 710/262

FOREIGN PATENT DOCUMENTS

| JP | 60128535 | 7/1985 |
| JP | 63310029 | 12/1988 |
| JP | 03041520 | 2/1991 |
| JP | 05113887 | 5/1993 |
| JP | 05224951 | 9/1993 |
| JP | 07219789 | 8/1995 |
| JP | 08297581 | 11/1996 |

OTHER PUBLICATIONS

Japanese Office Action issued on a corresponding Japanese application on Mar. 2, 2004.

* cited by examiner

Primary Examiner—Glenn A. Auve
(74) Attorney, Agent, or Firm—Stevens, Davis, Miller & Mosher, LLP (57) ABSTRACT

An interrupt management section 103 for holding interrupt acceptance possibility states prepared for each of interrupt sources 121 to 122, and an interrupt mask cancellation section 104 for controlling interrupt enabling in interrupt processing tasks 127, are provided, and a multiple interruption control section 109 is provided for performing interrupt mask update control using sections 103 and 104 within an interrupt handler 101.

13 Claims, 10 Drawing Sheets

| | IRQ15 | IRQ14 | IRQ13 | IRQ12 | IRQ11 | IRQ10 | IRQ9 | IRQ8 | IRQ7 | IRQ6 | IRQ5 | IRQ4 | IRQ3 | IRQ2 | IRQ1 | IRQ0 |
|---|---|---|---|---|---|---|---|---|---|---|---|---|---|---|---|---|
| LEVEL0 IMFG2  | 0 | 0 | 0 | 0 | 0 | 0 | 0 | 0 | 0 | 0 | 0 | 0 | 0 | 0 | 0 | 0 |
| IMFG3  | 0 | 0 | 0 | 0 | 0 | 0 | 0 | 0 | 0 | 0 | 0 | 0 | 0 | 0 | 0 | 0 |
| LEVEL1 IMFG0  | 0 | 0 | 0 | 0 | 0 | 0 | 0 | 0 | 0 | 0 | 0 | 0 | 0 | 0 | 0 | 0 |
| IMFG1  | 0 | 0 | 0 | 0 | 0 | 0 | 0 | 0 | 0 | 0 | 0 | 0 | 1 | 0 | 0 | 0 |
| LEVEL2 IMFG15 | 0 | 0 | 0 | 0 | 0 | 0 | 0 | 0 | 0 | 0 | 0 | 0 | 1 | 1 | 1 | 1 |
| IMFG14 | 0 | 0 | 0 | 0 | 0 | 0 | 0 | 0 | 0 | 0 | 0 | 0 | 1 | 1 | 1 | 1 |
| IMFG13 | 0 | 0 | 0 | 0 | 0 | 0 | 0 | 0 | 0 | 0 | 0 | 0 | 1 | 1 | 1 | 1 |
| IMFG12 | 0 | 0 | 0 | 0 | 0 | 0 | 0 | 0 | 0 | 0 | 0 | 0 | 1 | 1 | 1 | 1 |
| IMFG4  | 0 | 0 | 0 | 0 | 0 | 0 | 0 | 0 | 0 | 0 | 0 | 1 | 1 | 1 | 1 | 1 |
| LEVEL3 IMFG5  | 1 | 1 | 1 | 1 | 1 | 0 | 0 | 0 | 0 | 0 | 0 | 1 | 1 | 1 | 1 | 1 |
| IMFG6  | 1 | 1 | 1 | 1 | 1 | 0 | 0 | 0 | 0 | 0 | 0 | 1 | 1 | 1 | 1 | 1 |
| IMFG7  | 1 | 1 | 1 | 1 | 1 | 0 | 0 | 0 | 0 | 0 | 0 | 1 | 1 | 1 | 1 | 1 |
| IMFG8  | 1 | 1 | 1 | 1 | 1 | 0 | 0 | 0 | 0 | 0 | 0 | 1 | 1 | 1 | 1 | 1 |
| IMFG9  | 1 | 1 | 1 | 1 | 1 | 0 | 0 | 0 | 0 | 0 | 0 | 1 | 1 | 0 | 1 | 1 |
| IMFG10 | 1 | 1 | 1 | 1 | 1 | 0 | 0 | 0 | 0 | 0 | 0 | 1 | 1 | 1 | 0 | 1 |
| IMFG11 | 1 | 1 | 1 | 1 | 1 | 0 | 0 | 0 | 0 | 0 | 0 | 1 | 1 | 1 | 1 | 1 |

INTERRUPTION MANAGING DEVICE AND INTERRUPTION MANAGING METHOD

TECHNICAL FIELD

The present invention relates to an apparatus and method for performing interrupt management in a computer processing real-time operation system (real-time OS), multitask operation system (multitask OS), and signal processing processor (DSP), and relates in particular to a suitable interrupt management apparatus and interrupt management method used in an image terminal apparatus, etc., such as a portable videophone apparatus or the like, in a mobile communication system using the W-CDMA (Wide band-Code Division Multiple Access) method.

BACKGROUND ART

Conventionally, in a microprocessor system, when an asynchronous interrupt request due to a source such as an interrupt request from an external device or external apparatus, or a software interrupt request from an executing application program, (generically termed "interrupt request" below) is generated while the microprocessor (termed "CPU" below) is executing program processing, the executing program processing is suspended and interrupt request processing is performed.

On the other hand, a DSP has an internal main processor (termed "MP" below) as an entity corresponding to the above-described CPU, and if an interrupt request is generated while this MP is executing program processing, the executing program processing is suspended and interrupt request processing is performed. Below, the minimum unit of a program is called a task.

As the content of the processing performed in response to an interrupt request differs for each interrupt source, the user must create in advance an interrupt service routine (termed "interrupt processing task" below) for each interrupt source. An interrupt request is reported to the CPU or MP by control means (called "interrupt controller" below) that reports the generation of an interrupt. The CPU or MP identifies the interrupt source, calls the corresponding interrupt processing task, and performs processing of the interrupt request.

When task processing being executed by the CPU or MP is suspended due to generation of an interrupt request, the task address at which processing is to be restarted and the contents of CPU or MP internal registers being used up to that time (termed "computational resources currently involved in processing" below) are saved before the interrupt processing task is executed. Then, when the interrupt processing task ends, these internal registers are restored to their original state, and the task processing that was being executed is restarted.

If processing for saving and restoring computational resources currently involved in processing is written within an above-described interrupt processing task, interrupt processing task creation becomes complicated, and therefore in a microprocessor system that has a CPU, such processing is generally performed by calling a real-time OS or multitask OS (generically termed "OS" below) interrupt management facility (referred to below as a "system call").

In a DSP that has an MP, the above-described interrupt management facility is usually constructed as a monitor program of software of a single individual task separate from the interrupt processing task (in the case of a DSP, usually called microcode or firmware).

Below, the above-described interrupt management facility and the above-described monitor program are given the generic name of "interrupt handler."

Interrupt processing is classified into single interruption in which acceptance of other interrupts is disabled while interrupt processing is being performed, and multiple interruption in which acceptance of other interrupts is possible even while interrupt processing is being performed.

With single interruption, when an interrupt is generated computational resources currently involved in processing are saved by the interrupt handler to that task's stack area and task control means, and at the same time, the interrupt mask is masked, disabling other interrupts, and interrupt processing is performed. Then, when interrupt processing is completed and execution of the suspended task is to be resumed, the task stack information, task control means, and interrupt mask are restored.

On the other hand, when multiple interruption is possible, when the interrupt mask is masked to disable other interrupts by the interrupt handler, interrupt masking is not set, and interrupt processing is performed, for higher interrupt levels. That is to say, with an interrupt handler that has multiple interruption capability, if a plurality of interrupts are generated it is necessary to decide which interrupts are to be disabled.

However, in deciding acceptance/disabling of other interrupts within an interrupt task, the interrupt handler and interrupt processing task are closely associated, and there is a problem in that it is not possible for changes to the content of interrupt processing by the interrupt handler and changes to the content of interrupt processing by the interrupt processing task to be carried out independently of each other.

Meanwhile, in deciding acceptance/disabling of other interrupts using an OS, the interrupt handler in the OS decides acceptance/disabling of interrupts en bloc for all interrupt sources, and therefore there is a problem in that the user must create an interrupt processing task while being aware of the interrupt management state of the interrupt handler within the OS. There is a further problem in that it is not possible to construct interrupt processing that does not depend on the interrupt management state of the interrupt handler within the OS.

Unexamined Japanese Patent Publication No. 5-224951 discloses a management method comprising duplicate interruption specifying means for specifying a software interrupt when started by a CPU that receives an interrupt request and shifting processing to the OS before a shift of processing to the interrupt handler, interrupt handler starting means for performing interrupt source analysis and saving of registers within the OS and starting the interrupt handler when processing has been shifted via the duplicate interruption specifying means, and interrupt handler end processing means for performing restoration of registers within the OS and restarting the suspended processing when the end of interrupt processing is reported by the interrupt handler.

According to the management method described in this Unexamined Japanese Patent Publication No. 5-224951, processing for saving and restoring registers within the OS and processing by an interrupt handler can be separated by the duplicate interruption specifying means, and an improvement in interrupt handler creation efficiency can be achieved. However, there is a problem in that nothing is disclosed concerning means for separating the interrupt handler and interrupt processing task, and it is still not possible for changes to the content of processing by the interrupt handler and changes to the content of interrupt processing by the interrupt processing task to be carried out independently.

Also, Unexamined Japanese Patent Publication No. 8-297581 discloses a technique whereby an interrupt controller is provided that has a plurality of interrupt input means that can be individually masked, and that reports interrupts to the CPU according to input to unmasked interrupt input means; specific interrupt manipulating processing means for manipulating an interrupt mask table in the interrupt controller is provided within the OS; and in addition only information relating to interrupts that it is wished to be managed by the OS is stored in managed interrupt storing means, and in an interval in which exclusive control is performed during OS system call processing, only interrupts for which information is stored in the managed interrupt storing means are disabled, and the interrupt enabled state is continued for interrupts for which a system call is not issued.

According to the technique described in this Unexamined Japanese Patent Publication No. 8-297581, an interrupt task that does not affect resource management by the OS is no longer influenced by the OS, and the processing of that interrupt processing task can be constructed in isolation from the OS. However, there is a problem in that an interrupt processing task related to resource management by the OS is closely associated with OS processing, and, as before, it is necessary to create an interrupt processing task while being aware of the interrupt enabling/disabling processing content in the interrupt handler within the OS.

DISCLOSURE OF INVENTION

It is an objective of the present invention to provide an interrupt management apparatus and interrupt management method that enable the content of interrupt processing by an interrupt handler or interrupt processing task to be changed easily when it is necessary to change interrupt handler processing, such as when it is to be made possible for other interrupts to be accepted within an interrupt task, or when other interrupts are to be disabled. It is a further objective of the present invention to provide an interrupt management apparatus and interrupt management method that enable the user to create an interrupt processing task without being aware of the interrupt enabling/disabling processing content in an interrupt handler within the OS when interrupts are managed using the OS, even if the interrupt handler within the OS performs interrupt enabling/disabling processing en bloc for all interrupt sources, and to make it possible to construct interrupt processing that does not depend on the interrupt management state of the interrupt handler within the OS.

These objectives are achieved by providing, independently of an interrupt handler that stipulates processing for each interrupt source, interrupt managing means for holding interrupt acceptance possibility states prepared for each interrupt source, and interrupt mask canceling means for canceling a mask set for an interrupt source for which an interrupt is accepted, wherein the interrupt handler controls interrupt enabling/disabling for each interrupt source by updating the interrupt mask using the above-described interrupt managing means and the above-described interrupt mask canceling means.

BEST MODE FOR CARRYING OUT THE INVENTION

Embodiments of the present invention will be described specifically below with reference to accompanying drawings.

(Embodiment 1)

Figure 1:
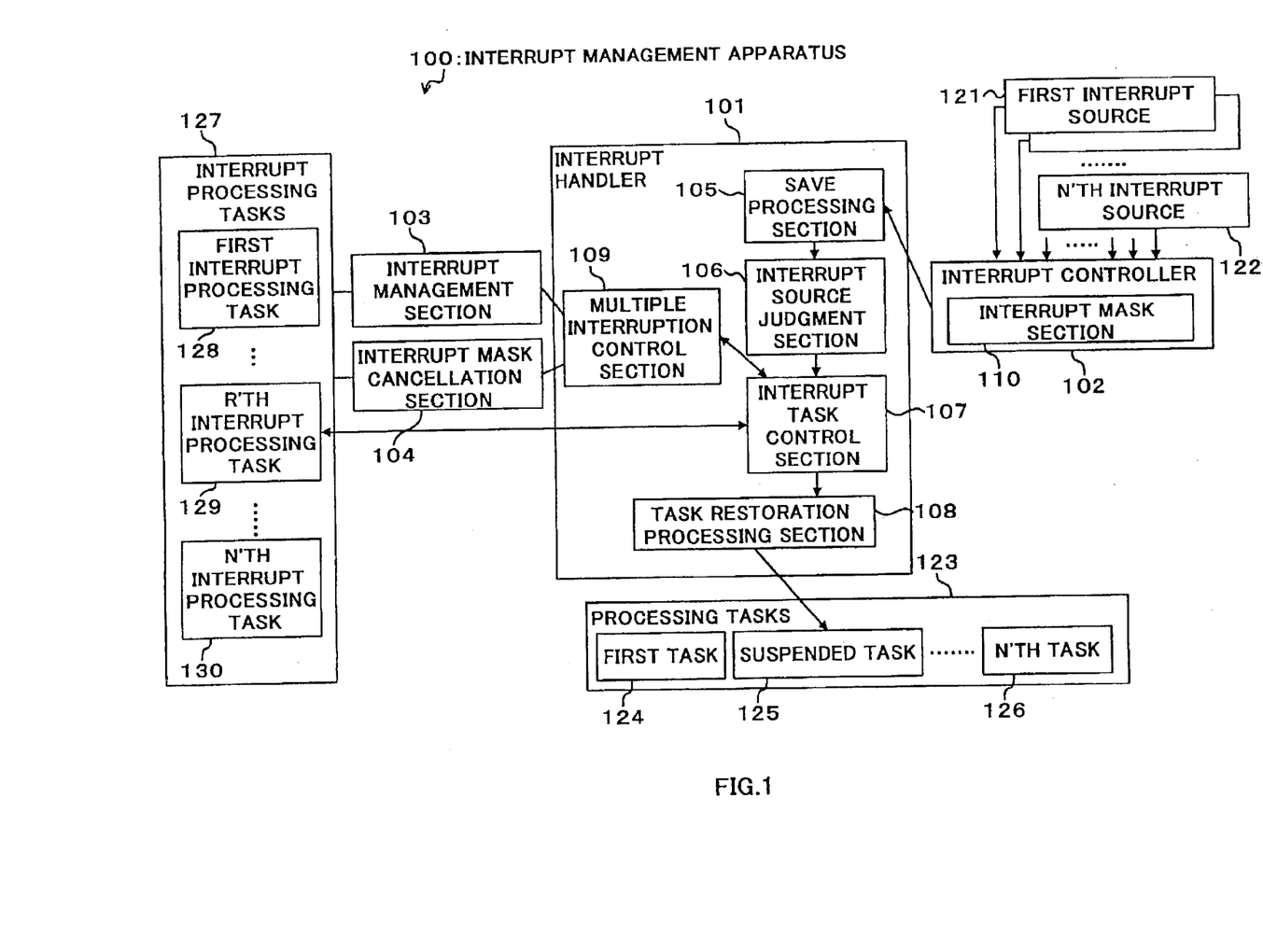
FIG. 1 is a drawing showing the configuration of an interrupt management apparatus according to Embodiment 1 of the present invention.

FIG. 1 is a drawing showing the configuration of an interrupt management apparatus according to Embodiment 1 of the present invention.

The interrupt management apparatus 100 shown in FIG. 1 comprises an interrupt handler 101, an interrupt controller 102, an interrupt management section 103, and an interrupt mask cancellation section 104; the interrupt handler 101 comprises a save processing section 105, an interrupt source judgment section 106, an interrupt task control processing section 107, a task restoration processing section 108, and a multiple interruption control section 109; and the interrupt controller 102 comprises an interrupt mask section 110.

Also, reference numbers 121 to 122 denote first to N'th interrupt sources, reference number 123 denotes processing tasks that comprise first to N'th tasks 124 to 126, and reference number 127 denotes interrupt processing tasks that comprise first to N'th interrupt processing tasks 128 to 130.

The interrupt controller 102 comprises an interrupt mask section 110 that sets a mask for each interrupt source consisting of first interrupt source 121 to N'th interrupt source 122. In the event of input of a first interrupt source 121 to N'th interrupt source 122, the interrupt controller 102 notifies the interrupt handler 101 of generation of an interrupt corresponding to an interrupt source for which a mask has not been set by the interrupt mask section 110.

The save processing section 105 performs processing to save (retain) various kinds of information on the task that was being executed at the time of interrupt generation.

The interrupt source judgment section 106 determines the interrupt processing task that should be executed according to the interrupt source.

The interrupt management section 103 holds interrupt acceptance possibility states prepared for each interrupt source independently of the interrupt handler 101.

The interrupt mask cancellation section 104 controls interrupt enabling by canceling the mask set for interrupt sources for which an interrupt is to be accepted in an interrupt processing task, independently of the interrupt handler 101. In the interrupt mask cancellation section 104, a setting state is held whereby the interrupt mask is set to the mask cancellation state (1).

The multiple interruption control section 109 performs interrupt mask update control using the interrupt management section 103 and interrupt mask cancellation section 104.

The interrupt task control section 107 shifts processing between the determined interrupt processing task and interrupt handler.

Next, the operation of the interrupt management apparatus 100 with the above-described configuration will be described.

Figure 2A:
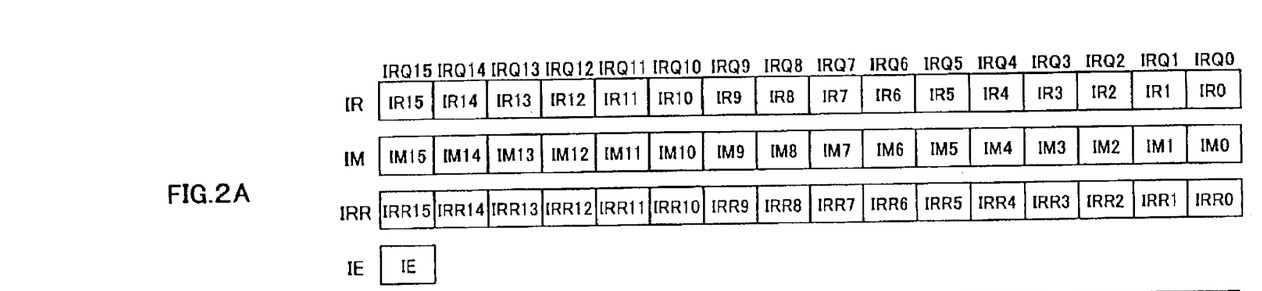
FIG. 2A is a drawing showing the operation of an interrupt controller according to Embodiment 1.

FIG. 2A is a drawing showing the operation of the interrupt controller 102. Here, to simplify the explanation, the case is described where 16 kinds of individually maskable interrupt sources (designated IRQn: n=0, 1, . . . , 15) are input to the interrupt management apparatus 100 according to this embodiment. The interrupt management apparatus 100 is provided with an interrupt request register (called IR: Interrupt Request) indicating generation of individual interrupt sources, an interrupt mask register (called IM: Interrupt Mask) that controls interrupt disabling (0)/enabling (1) for individual interrupt sources, and an interrupt request reset register (called IRR: Interrupt Request Reset) used to reset the interrupt request register IR. The interrupt mask register is provided in the interrupt mask section 110. A common interrupt enable flag (called IE: Interrupt Enable) is set for all maskable interrupt sources. This interrupt enable flag controls interrupt disabling (0)/enabling (1).

When an interrupt is generated, the corresponding bit in the interrupt request register is set to 1. Then, the corresponding bit in IR is reset (0) by making a setting (1) in IRR by software. As an example, FIG. 2A shows the case where the IR, IM, and IRR registers are each implemented using a 16-bit register.

FIG. 2A shows IR, IM, IRR, and IE, with the bits corresponding to individual interrupt sources IRQn (n=0, 1, . . . , 15) indicated by IRn, IMn, and IRRn (n=0, 1, . . . , 15).

Figure 2B:
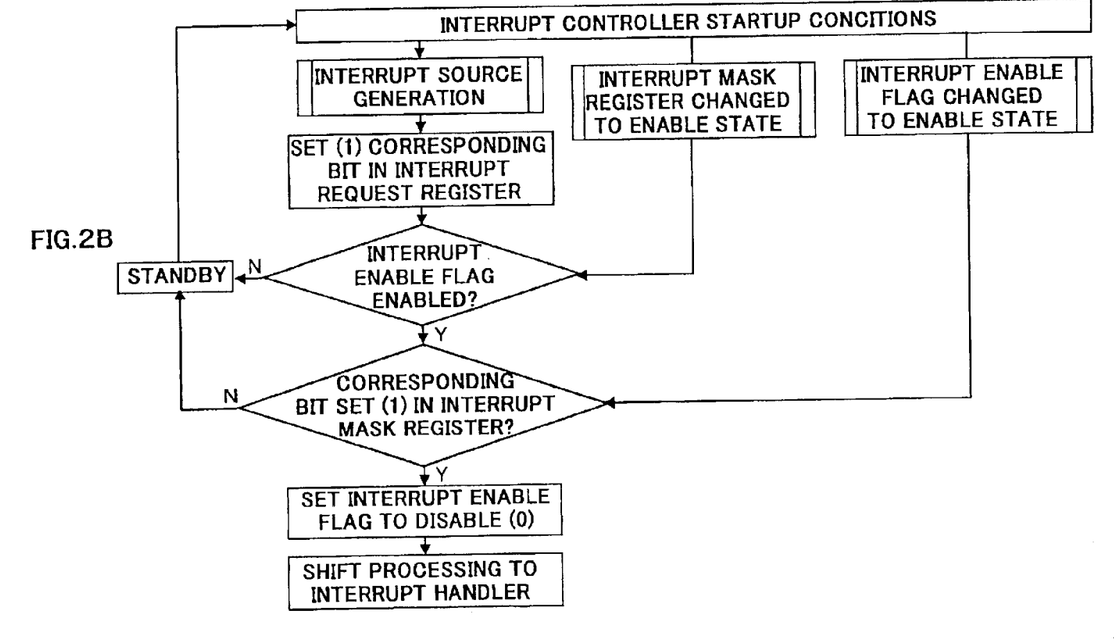
FIG. 2B is a drawing showing the operation flow of an interrupt controller according to Embodiment 1.

FIG. 2B shows the processing flow of the interrupt controller 102 when an interrupt source occurs. As shown in FIG. 2B, when an interrupt source occurs the corresponding bit in the interrupt request register is set (1), and if the interrupt enable flag has been set (1) and the corresponding bit in the interrupt mask register is enabled (1), the interrupt enable flag is set to the disable state (0) and then processing shifts to the interrupt handler. The interrupt source judgment processing shown in FIG. 2B is also performed when the interrupt enable flag or interrupt mask register changes from the disable (0) state to the enable (1) state.

The processing by the interrupt handler 101 will be described below. Here, to simplify the explanation, the case is described where four kinds of interrupt sources—IRQ14, IRQ12, IRQ1, and IRQ0—have been set (1) as interrupt sources in interrupt request register IR; IM15, IM14, IM3, IM1, and IM0 have been set to the interrupt enable (1) state in interrupt mask register IM; and an interrupt mask whereby all interrupts are enabled is held as the setting state in a register (IMFGreg) provided in the interrupt management section 103, when processing shifts to the interrupt handler 101.

It is also assumed that there are no interrupt sources for which mask cancellation should be performed in the interrupt mask cancellation section 104 at this time. That is, it is assumed that all bits in the register provided in the interrupt mask cancellation section 104 have been set to the clear (0) state.

In addition, four interrupt levels have been set as interrupt source interrupt levels as shown below.

Level 0 interrupt sources: IRQ2, IRQ3
Level 1 interrupt sources: IRQ0, IRQ1
Level 2 interrupt sources: IRQ15, IRQ14, IRQ13, IRQ12, IRQ4
Level 3 interrupt sources: IRQ5, IRQ6, IRQ7, IRQ8, IRQ9, IRQ10, IRQ11

These interrupt levels represent interrupt priority levels, with the following order of priority from high to low: level 0>level 1>level 2>level 3.

The interrupt management section 103 holds a setting state (called IMFG) in the interrupt mask register with only interrupt sources of a higher priority level than the interrupt source level for each interrupt set to the interrupt enable (1) state.

Figure 3:
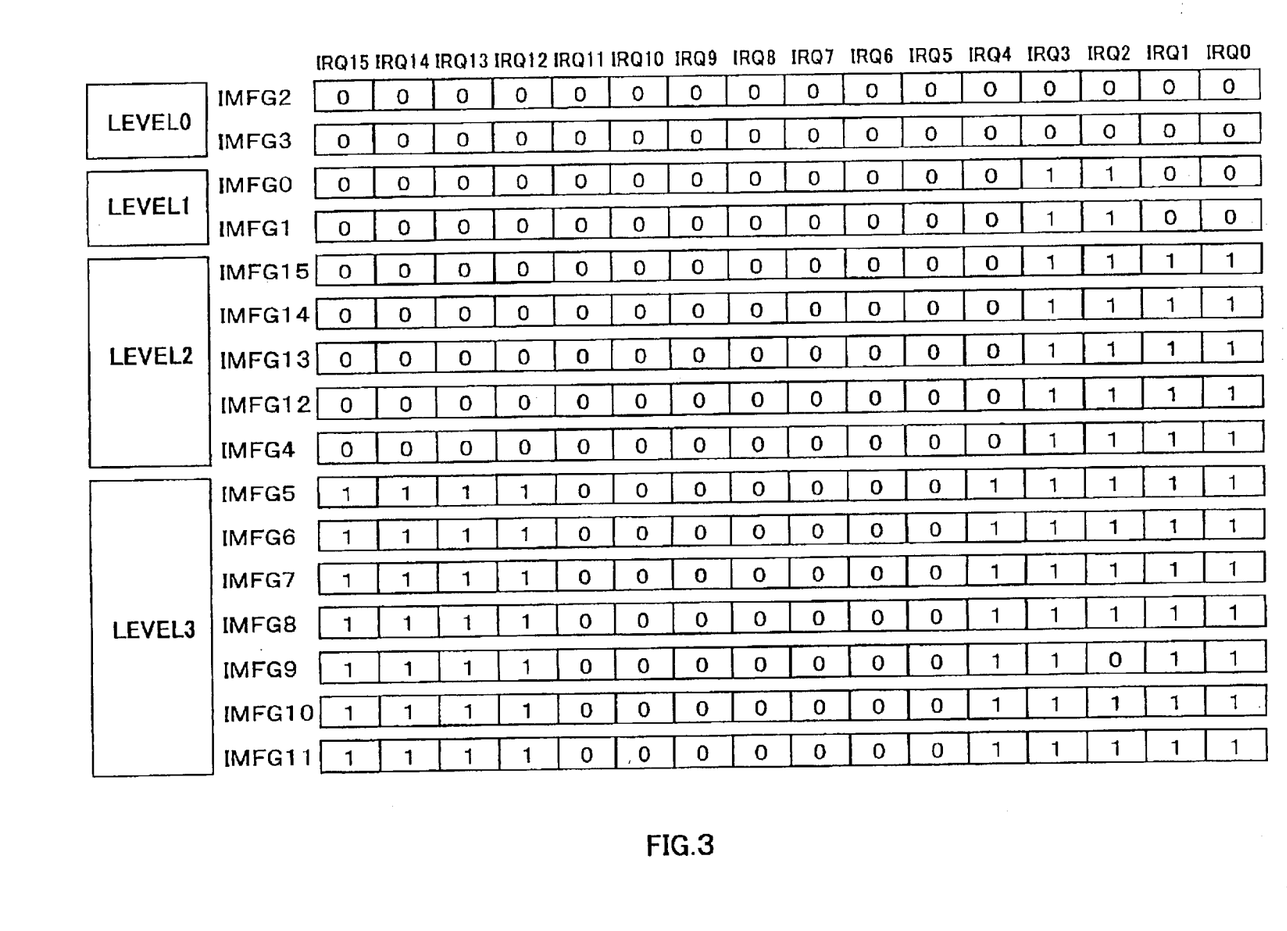
FIG. 3 is a drawing showing the interrupt mask register setting state for each interrupt source held in an interrupt management section according to Embodiment 1.

FIG. 3 shows the interrupt mask register setting states that should be set for the above-described interrupt levels, with IMFGn (n=0, 1, . . . , 15) corresponding to IRQn (n=0, 1, . . . , 15). For example, with IMFG14 corresponding to interrupt source IRQ14, the bits for IRQ0, IRQ1, IRQ2, and IRQ3, which have a higher level than IRQ14, are set to the enable (1) state. Also, in the case of IMFG2 corresponding to interrupt source IRQ2, all bits are set to the disable (0) state since there are no interrupt sources of a higher level than IRQ2.

First, when processing shifts to the interrupt handler 101, various kinds of information on the processing task that was being executed at that time (taking this processing task as suspended task 125) are saved by the save processing section 105.

Next, the interrupt source judgment section 106 judges which interrupt source processing is to be performed for, using the interrupt management section 103, for interrupt sources reported from the interrupt controller 102, and determines the interrupt processing task to be called.

Figure 4:
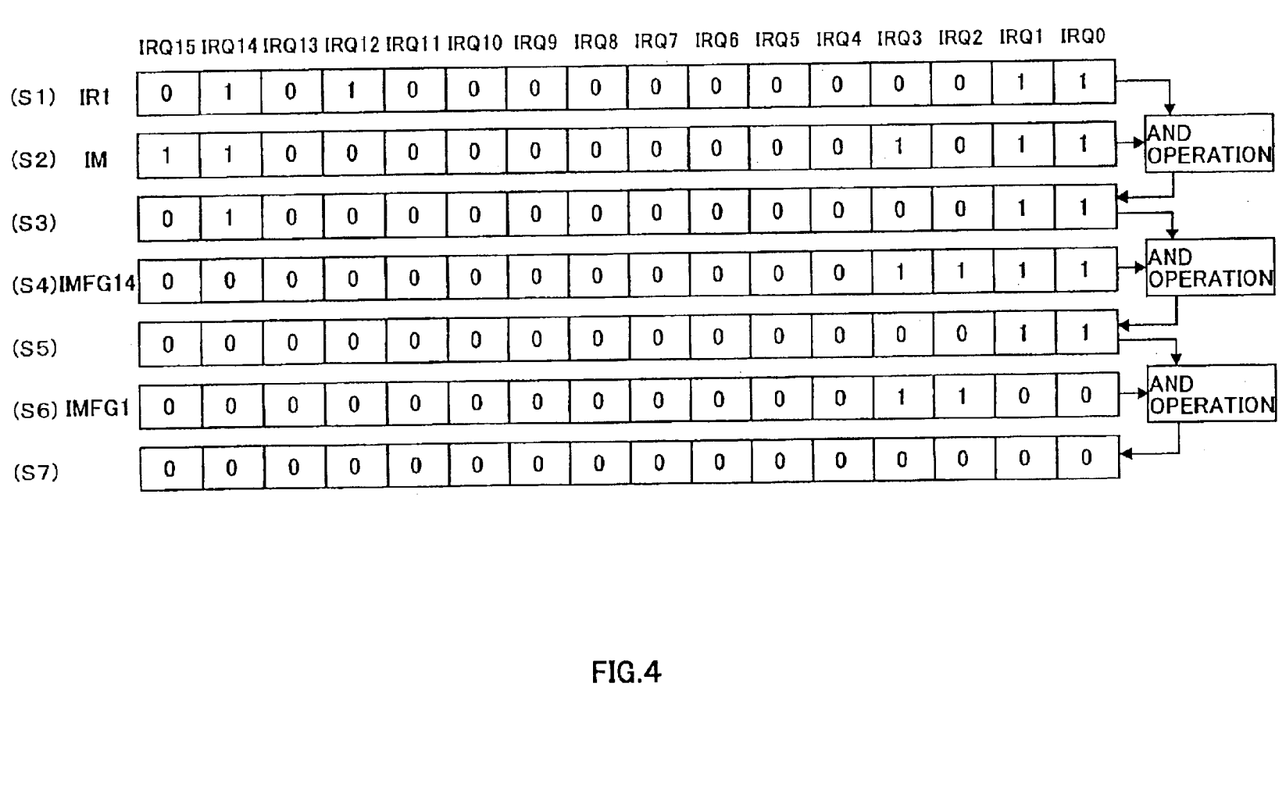
FIG. 4 is a drawing for explaining the interrupt source judgment processing procedure according to Embodiment 1.

FIG. 4 is an explanatory drawing of the interrupt source judgment processing procedure. As four kinds of interrupt sources—IRQ14, IRQ12, IRQ1, and IRQ0—are set (1) as interrupt sources, corresponding bits IR14, IR12, IR1, and IR0 are 1 in interrupt request register IR (S1).

As IM15, IM14, IM3, IM1, and IM0 are set to the interrupt enable (1) state as the interrupt mask register IM setting state, corresponding bits IM15, IM14, IM3, IM1, and IM0 are 1 in interrupt mask register IM (S2).

Next, the corresponding bits of S1 and S2 are ANDed (S3).

In the S3 state, evaluation is performed in order from the MSB (Most Significant Bit) side, and the interrupt source corresponding to the first bit with a value of 1 is selected. In this case, the bit at the position corresponding to IRQ14 is the first with a value of 1, and therefore IRQ14 is selected as the interrupt source.

Next, interrupt mask register setting state IMFG14 corresponding to the selected interrupt source IRQ14 (that is, the value of IMFG14 shown in FIG. 3) is obtained for the setting state IMFG for the interrupt mask register held in the interrupt management section 103 (S4).

The states obtained in S3 and S4 are then ANDed bit by bit (S5).

Next, the same evaluation is performed as on the S3 state, and IRQ1 is selected as the interrupt source.

Then the same kind of processing is performed as in S4, and IMFG1 (that is, the value of IMFG1 shown in FIG. 3) is obtained from the interrupt management section 103 (S6).

Next, when the states obtained in S5 and S6 are ANDed bit by bit, as in S5, all the bits become 0 (S7), and therefore there is no interrupt source that should be selected when the same evaluation is performed as for the S3 state. The interrupt source selected in the evaluation immediately before the evaluation in which there was no interrupt source that should be selected—that is, IRQ1—is selected as the interrupt source, the interrupt processing task corresponding to IRQ1 is determined as the interrupt processing task to be called, and processing shifts to the interrupt task control processing section 107. The interrupt processing task corresponding to IRQ1 is the R'th interrupt processing task 129.

As IRQ1 is selected as the interrupt source, a reset (0) of the IRQ1 interrupt source set in interrupt request register IR is performed by setting (1) the bit corresponding to IRQ1 in interrupt request reset register IRR—that is, IRR1.

Figure 5:
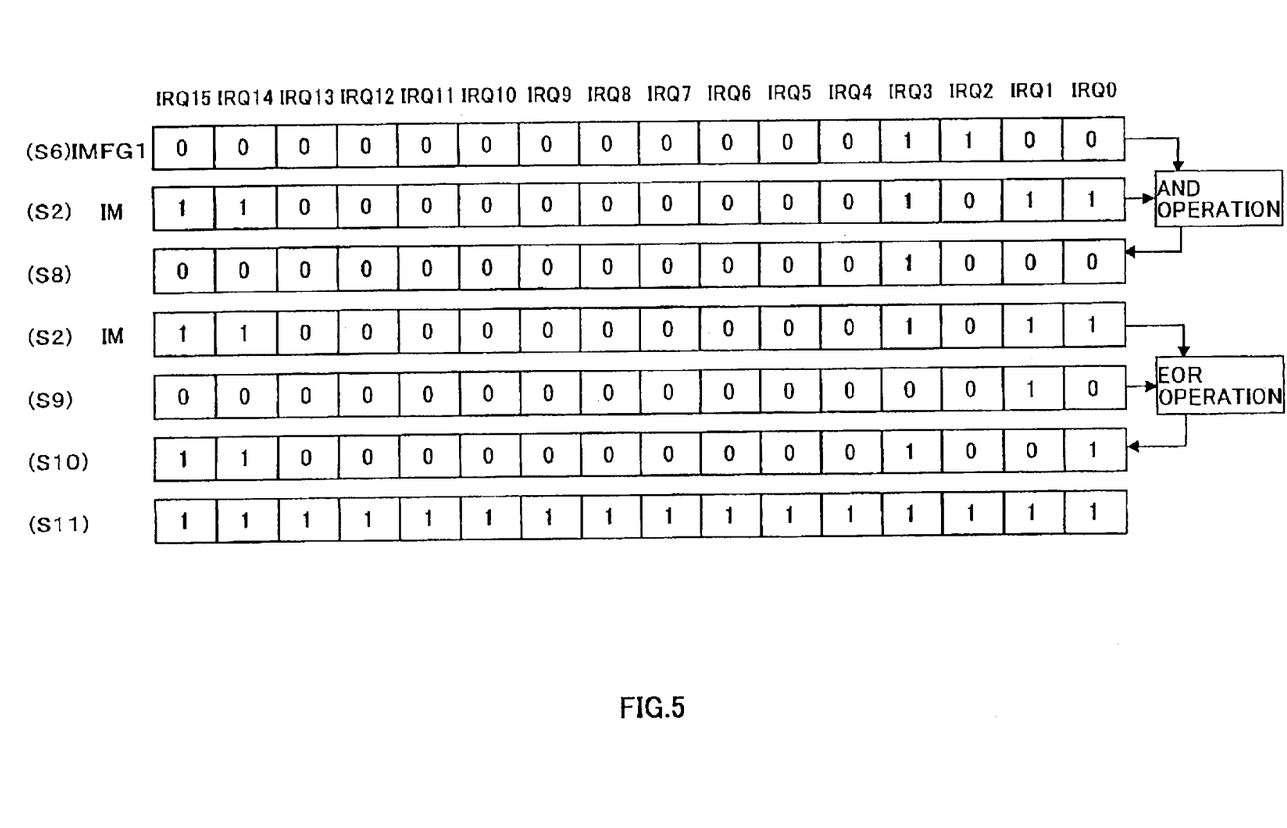
FIG. 5 is a drawing for explaining the processing procedure of a multiple interruption control section according to Embodiment 1.

FIG. 5 is an explanatory drawing of the processing procedure of the multiple interruption control section 109.

The multiple interruption control section 109 fetches interrupt mask IMFG1 corresponding to the determined R'th interrupt processing task 129 from the interrupt management section 103 that holds interrupt acceptance possibility states prepared for each interrupt source, and sets it in the interrupt mask section 110 of the interrupt controller 102.

At this time, since an interrupt mask has already been set by the interrupt mask section 110 of the interrupt controller 102 at the time of interrupt generation, no change is made to the interrupt mask corresponding to an interrupt source that is in the interrupt disable state.

That is to say, the corresponding bits of S6 IMFG1 and S2 IM are ANDed, and the result of this AND operation determines the interrupt mask state to be set in the interrupt mask section 110. This mask state is then set in the interrupt mask section 110 (S8).

Also, in the interrupt mask state set in the interrupt controller 102 at the time of interrupt generation, the mask corresponding to interrupt source IRQ1 determined by the interrupt source judgment section 106 is updated to the interrupt disable state, and the updated interrupt mask state is subjected to save processing.

That is to say, the state obtained by EORing the state in which the bit corresponding to interrupt source IRQ1 is changed to 1 (S9) and S2 IM (S10) is saved (the save destination register is called IM_SHLTreg).

Moreover, the interrupt acceptance possibility management state held in the interrupt management section 103 at the time of interrupt generation is also saved. That is, the contents of IMFGreg—the state in which all interrupts are enabled—(S11) are saved (the register saved to is called IMFG_SHLTreg).

Next, the interrupt task control processing section 107 calls the R'th interrupt processing task 129 determined by the interrupt controller 102.

In the R'th interrupt processing task 129, processing corresponding to the interrupt is performed. If interrupt enabling is to be performed for an interrupt source newly input during this processing, information on the interrupt source for which interrupts are to be enabled is set to the interrupt cancellation state in the interrupt mask cancellation section 104. Also, if interrupt enabling is to be performed immediately, the interrupt mask corresponding to the interrupt source for which interrupts are to be enabled of the interrupt mask section 110 of the interrupt controller 102 is set to the mask cancellation state.

That is to say, if interrupt source IRQ2 is to be newly set as able to be accepted during R'th interrupt processing task 129 processing, the bit corresponding to IRQ2 in the interrupt mask cancellation section 104 is changed from the clear (0) state to the set (1) state.

Figure 6:
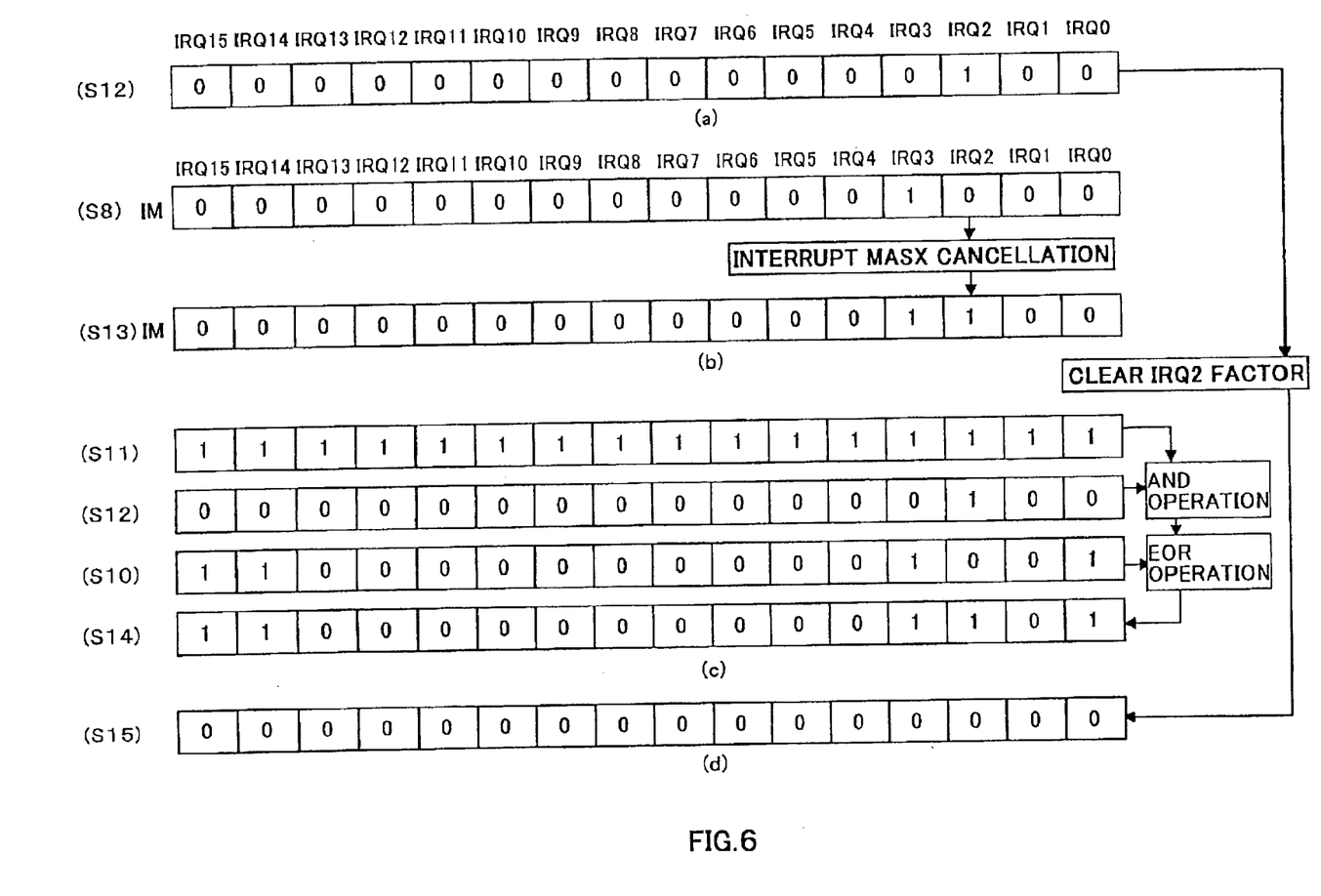
FIG. 6 is a drawing for explaining the processing procedure of an interrupt processing task according to Embodiment 1.

S12 shown in FIG. 6 shows the state of the interrupt mask cancellation section 104 at this time.

Also, since IRQ2 is a higher-level interrupt source than interrupt source IRQ1 which is subject to processing by the R'th interrupt processing task 129, the case is such that interrupt enabling is performed immediately, and the interrupt mask of the bit corresponding to IRQ2 is set to the cancellation (1) state for the S8 state, which is the setting state at the current point in time of the interrupt mask section 110 of the interrupt controller 102. S13 shown in FIG. 6 shows the state of the interrupt mask section 110 at this time.

When R'th interrupt processing task 129 processing ends, processing shifts again to the interrupt task control processing section 107.

At this time, the item that set the bit corresponding to IRQ2 of the interrupt mask state (S10) saved to IM_SHLTreg by the multiple interruption control section 109 to the interrupt enable state before the R'th interrupt processing task 129 was called is set in the interrupt mask section 110 of the interrupt controller 102. S14 shown in FIG. 6 shows the state of the interrupt mask section 110 at this time. IRQ2 is in the interrupt enable state in both the interrupt management section 103 state saved to IMFG_SHLTreg (S11) and the interrupt mask cancellation section 104 state set by the R'th interrupt processing task 129 (S12).

Moreover, information on the corresponding interrupt source of the interrupt mask cancellation section 104 is reset for interrupt source IRQ2 updated to the interrupt enable state at this time. S15 shown in FIG. 6 shows the interrupt mask cancellation section 104 state at this time.

The task restoration processing section 108 then restores various information on the task being executed at the time of interrupt generation that was saved by the save processing section 105, and restarts processing of the suspended task 125.

Thus, in the interrupt management apparatus 100 according to Embodiment 1, an interrupt management section 103 that manages whether or not interruption is possible for each interrupt source, and an interrupt mask cancellation section 104 that manages whether or not an interrupt mask is to be canceled, are both provided independently of the interrupt handler 101. The interrupt handler 101 stipulates processing for each interrupt source, using a setting state that manages whether or not interruption is possible, held in the interrupt management section 103, and a setting state that performs mask cancellation, held in the interrupt mask cancellation section 104. In particular, interrupt enabling/disabling is managed for a plurality of interrupt sources.

As the multiple interruption control section 109 controls interrupt enabling/disabling using the interrupt management section 103 and interrupt mask cancellation section 104, even if it becomes necessary to change interrupt enabling/disabling control, such as when making it possible to accept other interrupts within an interrupt task or when disabling another interrupt following an interrupt, it is only necessary to change the interrupt management section 103 and interrupt mask cancellation section 104 setting states. Therefore, a programmer can create interrupt processing tasks 127 without being aware of interrupt enabling/disabling control (the interrupt management state) in the interrupt handler 101. Moreover, it is possible to construct interrupt processing that does not depend on the interrupt management state of the interrupt handler 101.

The present invention can also be implemented by software, and the present invention can also be implemented by reading this software from a recording medium.

Also, the present invention can be incorporated as an interrupt management facility in a signal processing processor (DSP), and is effective when implementing an application using interrupt processing independently of interrupt processing within the DSP.

Moreover, the present invention can be incorporated in interrupt processing within an OS such as a computer processing real-time operation system or multitask operation system, and in the construction of an application system that is implemented on a personal computer, it is effective when implementing an application that uses interrupt processing independently of interrupt processing within the OS; and moreover its effects are particularly evident when multiple interruption is used, since it is possible for interrupt levels to be constructed in a form that is independent of the interrupt facility within the OS.

(Embodiment 2)

Figure 7:
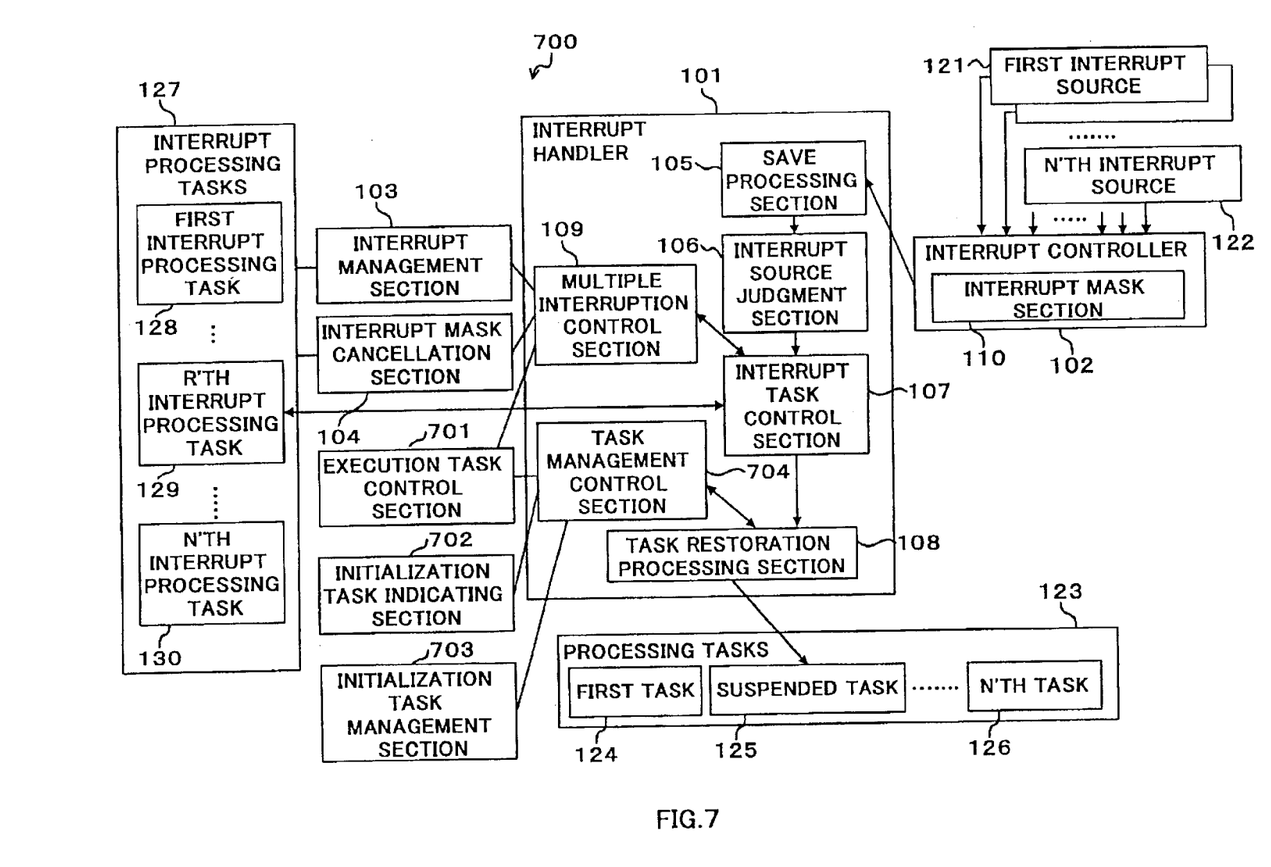
FIG. 7 is a drawing showing the configuration of an interrupt management apparatus according to Embodiment 2 of the present invention.

FIG. 7 is a drawing showing the configuration of an interrupt management apparatus according to Embodiment 2 of the present invention. The parts in FIG. 7 identical to those in Embodiment 1 shown in FIG. 1 are assigned the same numbers as in FIG. 1, and their detailed explanations are omitted.

The interrupt management apparatus 700 of Embodiment 2 shown in FIG. 7 has a configuration that comprises, in addition to the component elements of Embodiment 1, an execution task control section 701, an initialization task indicating section 702, an initialization task management section 703, and a task management control section 704 that is within the interrupt handler 101.

The initialization task management section 703 stores the call address of a task that performs processing task initialization processing independently of the interrupt handler 101.

The execution task control section 701 holds information on the task being executed.

The initialization task indicating section 702 sets a task for which initialization processing is necessary.

The task management control section 704 judges whether or not suspended task 125 initialization processing is necessary when returning to the suspended task 125, using the execution task control section 701 and initialization task indicating section 702, and if initialization processing is necessary, calls a task for performing initialization processing stored in the initialization task management section 703.

The operation of the interrupt management apparatus 700 according to Embodiment 2 of the present invention having such a configuration will now be described. To simplify the explanation, detailed explanations of parts of interrupt handler 101 processing that are the same as in Embodiment 1 are omitted.

Figure 8:
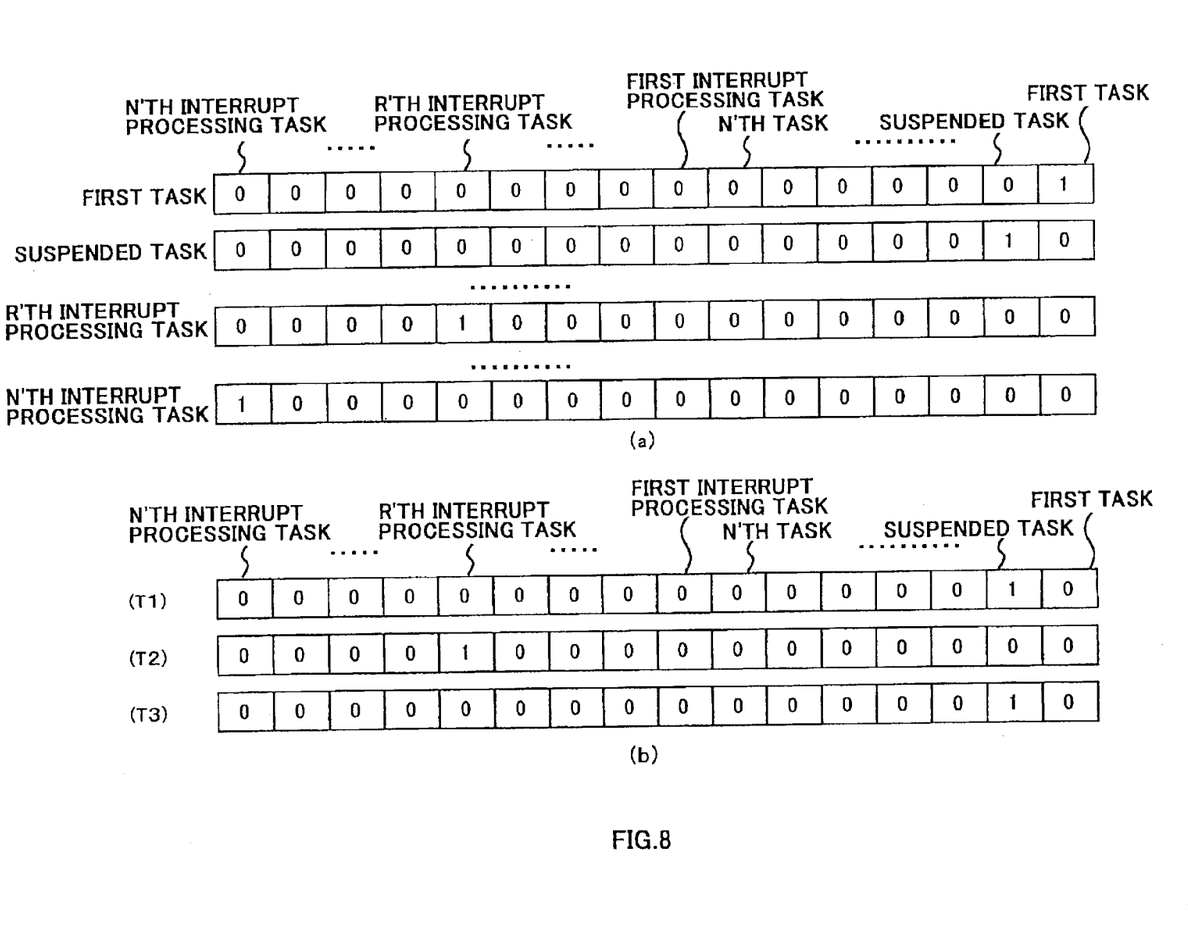
FIG. 8A is a drawing showing the state of executing task information stored in an execution task control section according to Embodiment 2.
FIG. 8B is a drawing showing transitions of states set in registers when a task for which initialization processing is necessary is set with correspondence to each bit according to Embodiment 2.

FIG. 8A shows the state of executing task information stored in an the execution task control section 701. In FIG. 8A the case is shown where management is performed by providing correspondence between processing tasks 123 and interrupt processing tasks 127 on a bit-by-bit basis.

FIG. 8B shows transitions of the states set in registers when a task for which initialization processing is necessary is set with correspondence to each bit in the initialization task indicating section 702 in the same was as for the execution task control section 701.

In the execution task control section 701 is stored information (called TSKINF) on the executing task from among the processing tasks 123 and interrupt processing tasks 127.

First, when processing shifts to the interrupt handler 101, 1 is set in the corresponding bit for the processing task that was being executed at that time (here, suspended task 125) (T1).

First, in the interrupt handler 101, information on the executing task (suspended task 125) stored in the execution task control section 701 at the time of interrupt generation—that is, the T1 state—is saved by the multiple interruption control section 109 (the register saved to is called TSKINF_SHLTreg), and information on the R'th interrupt processing task 129 determined by the interrupt source judgment section 106 (T2) is newly stored in the execution task control section 701.

Then, in the R'th interrupt processing task 129, if task initialization is necessary, information on the task to be initialized is stored in the initialization task indicating section 702.

The case where the suspended task 125 is set as a task requiring initialization will be considered. In this case, the corresponding bit for the suspended task 125 is set in the initialization task indicating section 702 (T3).

Then, when R'th interrupt processing task 129 processing ends, processing shifts again to the interrupt task control processing section 107. At this time, the information of the execution task control section 701 saved in TSKINF_SHLTreg before the interrupt processing task was called by the multiple interruption control section 109 (T2) and the information on the task to be initialized stored in the initialization task indicating section 702 (T3) are compared in the task management control section 704.

If the tasks compared by the task management control section 704 are indicated to be the same, the initialization task management section 703 performs initialization task processing for the suspended task 125 using the call address of the task that performs initialization processing for the corresponding task.

For example, as the execution task control section 701 information saved to TSKINF_SHLTreg is information on the task that was being executed at the time of interrupt generation, only the corresponding single bit is set to 1. Therefore, T2 and T3 are ANDed in the task management control section 704, and if the result of the AND operation is a nonzero value, it can be judged that the compared tasks indicate the same task, and in this case the tasks are the same.

In the task restoration processing section 108, restoration processing is performed if various information on the task that was being executed at the time of interrupt generation saved by the save processing section 105 is necessary.

Thus, an interrupt management apparatus 700 according to Embodiment 2 of the present invention has a configuration comprising an initialization task management section 703 for storing the call address of a task that performs task initialization processing, an execution task control section 701 for holding information on the task being executed, and an initialization task indicating section 702 for setting a task for which initialization processing is necessary. An interrupt management apparatus 700 having such a configuration judges whether or not suspended task 125 initialization processing is necessary when returning to the suspended task, using the execution task control section 701 and initialization task indicating section 702, and if the suspended task 125 requires initialization, the task management control section 704 calls the task for performing initialization processing using the call address stored in the initialization task management section 703.

Consequently, if a case arises where control is performed so that task processing is started from the initial state in the interrupt processing tasks 127, it is not necessary for the interrupt processing tasks 127 to initialize a task stack area, task control means, etc.

Therefore, the interrupt processing tasks 127 need not be aware of the processing content of a task to be initialized, and within the interrupt processing tasks 127 it is possible to construct a facility that can control the processing procedure for performing initialization independently of the interrupt processing tasks 127 and a task requiring initialization.

The present invention can also be implemented by software, and the present invention can also be implemented by reading this software from a recording medium.

Also, the present invention can be incorporated as an interrupt management facility in a signal processing processor (DSP), and is effective when implementing an application using interrupt processing independently of interrupt processing within the DSP.

Moreover, the present invention can be incorporated in interrupt processing within an OS such as a computer processing real-time operation system or multitask operation system. Therefore, the effects of the present invention are particularly evident in the construction of various kinds of application systems that are implemented on a personal computer, since it is possible for task initialization processing to be constructed in a form that is independent of the interrupt facility within the OS.

(Embodiment 3)

Figure 9:
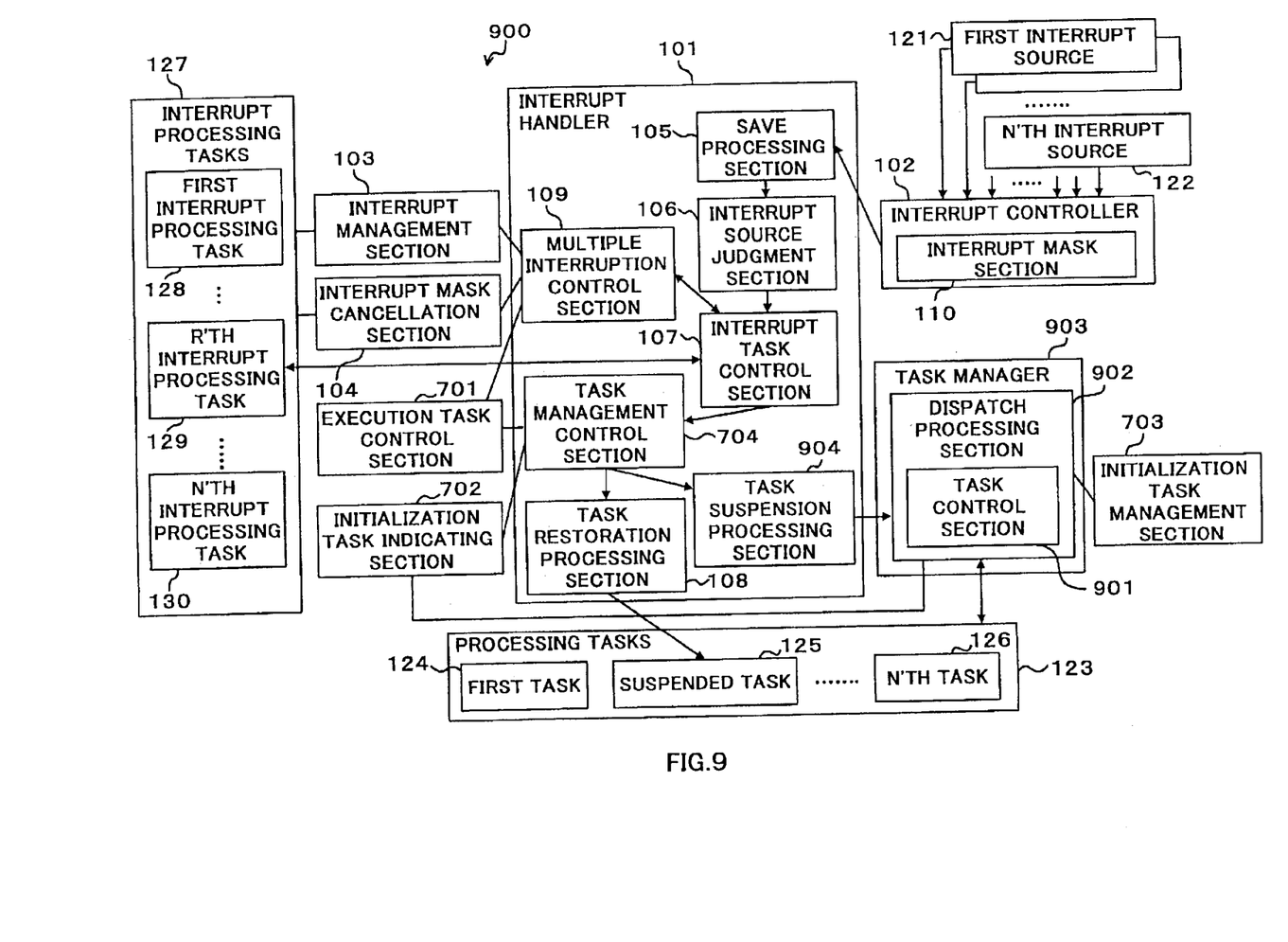
FIG. 9 is a drawing showing the configuration of an interrupt management apparatus according to Embodiment 3 of the present invention.

FIG. 9 is a drawing showing the configuration of an interrupt management apparatus according to Embodiment 3 of the present invention. The parts in FIG. 9 identical to those in Embodiment 2 shown in FIG. 7 are assigned the same numbers as in FIG. 7, and their detailed explanations are omitted.

The interrupt management apparatus 900 of Embodiment 3 shown in FIG. 9 has a configuration that comprises, in addition to the component elements of Embodiment 2, a task manager 903, and a task suspension processing section 904 that is provided within the interrupt handler 101. The task manager 903 is provided with a dispatch processing section 902, and the dispatch processing section 902 is further provided with a task control section 901.

The dispatch processing section 902 provided in the task manager 903 performs judgment of the processing task subject to processing for the part corresponding to the interrupt management apparatus 700 shown in FIG. 7, and performs switching processing for a processing task 123 to be called, using the task control section 901 that stores a call address for each processing task and the initialization task management section 703 that stores the call address of a task that performs task initialization processing.

The task suspension processing section 904 calls the dispatch processing section 902 without performing restoration of various information on the task being executed at the time of interrupt generation that was saved by the save processing section 105.

The task management control section 704 judges whether or not suspended task 125 initialization processing is necessary when returning to the suspended task 125, using the execution task control section 701 and initialization task indicating section 702, and, if suspended task 125 initialization processing is necessary, calls the task suspension processing section 904, or, if initialization processing is not necessary, calls the task restoration processing section 108.

The operation of the interrupt management apparatus 900 of Embodiment 3 having such a configuration will now be described.

When the task restoration processing section 108 performs suspended task 125 restoration processing in the interrupt handler 101, as with the task management control section 704 judgment is performed as to whether or not suspended task 125 initialization processing is necessary, using the execution task control section 701 and initialization task indicating section 702, and if initialization processing is necessary, the task that performs initialization processing, stored in the initialization task management section 703, is called.

That is to say, comparison processing is performed using the execution task control section 701 on information saved to TSKINF_SHLTreg before the interrupt processing task was called by the multiple interruption control section 109 (T2) and information on the task to be initialized, stored in the initialization task indicating section 702, (T3).

By this means, judgment is made as to whether or not suspended task 125 initialization processing is necessary when returning to the suspended task 125, and when returning to a task for which initialization processing is necessary, the task suspension processing section 904, not the task restoration processing section 108 that performs saving of various information on the task being executed at the time of interrupt generation that was saved by the save processing section 105, is called.

If initialization processing is not necessary, the task restoration processing section 108 that performs saving of various information on the task being executed at the time of interrupt generation that was saved by the save processing section 105 is called, and processing of the suspended task is restarted.

Then, comparison with the processing task indicated by the initialization task indicating section 702 when performing switching processing for the processing task called by the dispatch processing section 902 of the task manager 903 is performed using the same kind of method as in comparison processing by the task management control section 704, and if the processing task to be called is a task for which initialization processing is not necessary, a task for performing initialization processing is called using the call address stored in the initialization task management section 703.

Thus, according to the interrupt management apparatus 900 of Embodiment 3, when task initialization occurs, in the initialization processing restoration of various information on the task being executed at the time of interrupt generation that was saved by the save processing section 105 for which restoration is no longer necessary is not performed, and moreover, as regards initialization processing, it is possible to start processing from initialization processing only when that task is indicated again by the dispatch processing section 902 of the task manager 903.

The present invention can also be implemented by software, and the present invention can also be implemented by reading this software from a recording medium.

Also, the present invention can be incorporated as an interrupt management facility and task management facility in a signal processing processor (DSP), and is effective when implementing an application using interrupt processing independently of interrupt processing or a task manager within the DSP.

Moreover, the present invention can be incorporated in interrupt processing and task manager processing within an OS such as a computer processing real-time operation system or multitask operation system. Consequently, when accompanying initialization processing for various application systems implemented on a personal computer, restoration of various information on a task for which restoration is no longer necessary is not performed. And, with regard to initialization processing, also, it is possible to start processing from initialization processing only when that task is indicated again by the dispatch processing section 902 of the task manager 903.

(Embodiment 4)

Figure 10:
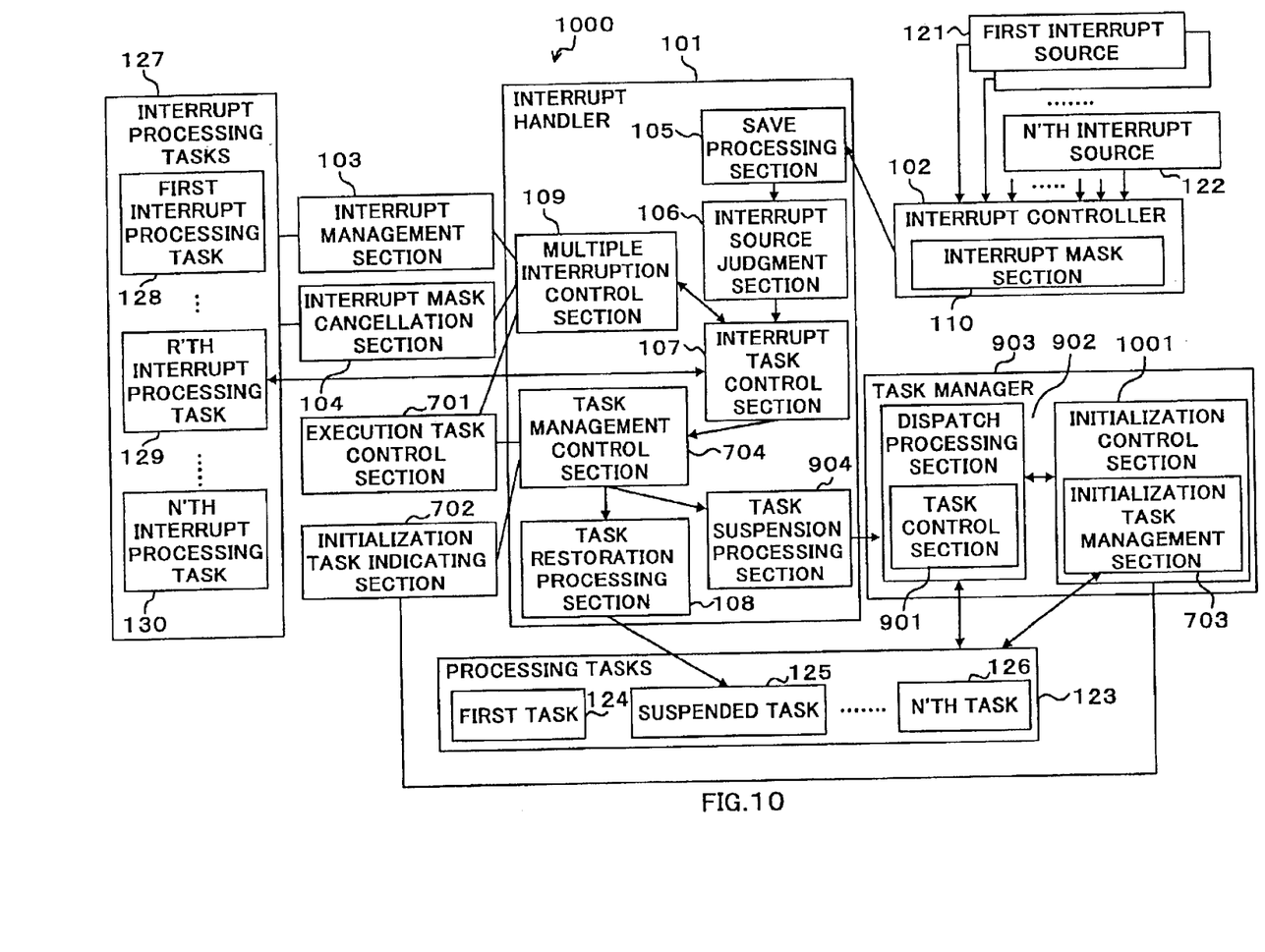
FIG. 10 is a drawing showing the configuration of an interrupt management apparatus according to Embodiment 4 of the present invention.

FIG. 10 is a drawing showing the configuration of an interrupt management apparatus according to Embodiment 4 of the present invention. The parts in FIG. 10 identical to those in Embodiment 3 shown in FIG. 9 are assigned the same numbers as in FIG. 9, and their detailed explanations are omitted.

The interrupt management apparatus 1000 of Embodiment 4 shown in FIG. 10 has a configuration that comprises, in addition to the component elements of Embodiment 3, an initialization control section 1001 that has an initialization task management section 703.

The initialization control section 1001 performs task initialization control using the initialization task management section 703 that stores the task activation start address when performing initialization of individual processing tasks.

The task manager 903 comprises the initialization control section 1001 and a dispatch processing section 902 that performs task switching processing using a task control section 901 that stores the call address of each processing task.

The operation of the interrupt management apparatus 1000 according to Embodiment 4 having such a configuration will now be described.

When called from a processing task 123, the initialization control section 1001 stores the call address from the processing task 123 in the initialization task management section 703 of the corresponding processing task, stores this in the initialization task indicating section 702 as information on the task that initializes the corresponding processing task, and shifts processing to the dispatch processing section 902.

When the initialization control section 1001 is called from the dispatch processing section 902, a task call is performed using the task activation start address stored in the initialization task management section 703 corresponding to the processing task indicated when it is called.

When the dispatch processing section 902 is called from a processing task 123, it stores the call address from the processing task 123 in the task control section 901 of the corresponding processing task.

When the dispatch processing section 902 is called from the task suspension processing section 904 or initialization control section 1001, when called processing task switching processing is performed, comparison is made with the processing task indicated by the initialization task indicating section 702.

If the called processing task is a task for which initialization processing is necessary, a task call is performed using the activation start address stored in the initialization task management section 703.

In other cases, a task call is performed using the call address corresponding to the processing task to be called from the task control section 901.

In the initialization control section 1001 and dispatch processing section 902, the method of obtaining the call address to be stored may be, for example, a method using a CALL instruction and POP instruction used by a DSP, etc.

A CALL instruction saves the program counter for the next instruction of the program that issued the CALL instruction on a stack, and shifts processing to the program counter value indicated by the CALL instruction. A POP instruction fetches the value saved on the stack.

By means of this CALL instruction, therefore, control shifts to predetermined processing of the initialization control section 1001 and dispatch processing section 902, and an address can be obtained by storing the program counter value of the return destination of the task called using the POP instruction in the initialization task management section 703 or task control section 901.

Thus, according to the interrupt management apparatus 1000 according to Embodiment 4 of the present invention, task management including initialization by the task manager 903 stipulates only address management and the control method, and therefore it is possible to construct processing task switching control that does not depend on the call address of an individual processing task.

The present invention can also be implemented by software, and the present invention can also be implemented by reading this software from a recording medium.

Also, the present invention can be incorporated as an interrupt management facility and task management facility in a signal processing processor (DSP). The present invention is effective when implementing an application using interrupt processing independently of interrupt processing or a task manager within the DSP.

Moreover, the present invention can be incorporated in interrupt processing and task manager processing within an OS such as a computer processing real-time operation system or multitask operation system. Consequently, it has the beneficial effect of making it possible to construct task switching processing that does not depend on processing within the OS for an application system implemented on a personal computer.

As described above, according to the present invention it is possible to perform changes in the content of interrupt processing by an interrupt handler or interrupt processing task easily when changing interrupt enabling/disabling processing in an interrupt handler, such as when making it possible to accept other interrupts within an interrupt task or when disabling another interrupt following an interrupt.

Also, in the case where, with an interrupt management method that uses an OS, the interrupt handler within the OS performs interrupt enabling/disabling processing en bloc for all interrupt sources, the user can create an interrupt processing task without being aware of the interrupt management state of the interrupt handler within the OS.

Moreover, as well as it being possible to construct interrupt processing that does not depend on the interrupt management state of the interrupt handler within the OS, if control arises whereby task processing is started from the initial state in an interrupt processing task, it is not necessary for the interrupt processing task to initialize a task stack area, task control means, etc.

Therefore, an interrupt processing task need not be aware of the processing content of an initializing task, and it is possible to construct a facility whereby the processing procedure for performing initialization can be controlled independently of an interrupt processing task and a task for which initialization is necessary.

Also, when task initialization occurs, of the various information on the task being executed at the time of interrupt generation that was saved by the save processing section, restoration is not performed of information for which restoration is not necessary in initialization processing.

Furthermore, in initialization processing, it is possible for processing to be started from initialization processing only when that task is indicated again by the dispatch processing section 902 of the task manager 903. As task management including initialization by the dispatch processing section 902 stipulates only address management and the control method, it is possible to construct processing task switching control that does not depend on the call address of an individual processing task.

This application is based on the Japanese Patent Application No.HEI 11-347294 filed on Dec. 7, 1999, entire content of which is expressly incorporated by reference herein.

INDUSTRIAL APPLICABILITY

The present invention performs interrupt management in a computer processing real-time operation system (real-time OS), multitask operation system (multitask OS), and signal processing processor (DSP), and is suitable for use in the field of an appropriate interrupt management apparatus and interrupt management method used in an image terminal apparatus, etc., such as a portable videophone apparatus or the like, in a mobile communication system using the W-CDMA (Wide band-Code Division Multiple Access) method.

What is claimed is:

1. An interrupt management apparatus, comprising:
   an interrupt manager that, independently of an interrupt handler, holds an interrupt acceptance possibility state that permits an interrupt source to be enabled only when the interrupt source has a higher interrupt level than an interrupt source that is being processed;
   an interrupt mask canceller that, while a first interrupt source is being processed, controls acceptance of a second interrupt source, independently of the interrupt handler; and
   a multiple interrupt controller that, upon occurrence of an interrupt by the first interrupt source, saves an interrupt mask state in which a mask for the first interrupt source is set to disable said first interrupt source and the use of the interrupt acceptance possibility state, and that, according to said interrupt acceptance possibility state and a control state of said interrupt mask canceller, updates the saved interrupt mask state and sets an interrupt mask for the second interrupt source.

2. The interrupt management apparatus according to claim 1, further comprising:
   an initialization task manager that stores a call address of a task for performing task initialization processing independently of said interrupt handler;
   an execution task controller that holds information on a task being executed;
   an initialization task indicator that sets a task for which initialization processing is necessary; and
   a task management controller that judges, based on processing of said execution task controller and said initialization task indicator, whether or not initialization processing is necessary for a suspended task when returning to said suspended task, and, when returning to a task for which initialization processing is necessary, executes a call of the task for performing initialization processing stored in said initialization task manager.

3. The interrupt management apparatus according to claim 2 further comprising:
   a task controller that determines a processing task that is subject to processing and stores a call address for each processing task;
   a task manager having a dispatch processor that performs called processing task switching processing according to processing of the initialization task manager; and
   a task suspension processor that calls said dispatch processor without performing restoration of information saved by a save processor for the task being executed at the time of interrupt generation, wherein:
   when returning to the task for which the initialization processing is necessary, said task management controller calls said task suspension processor, and
   when returning to a task for which initialization processing is not necessary, said task management controller calls said task restoration processor.

4. The interrupt management apparatus according to claim 3, wherein said task manager comprises an initialization controller that performs task initialization control according to processing of said initialization task manager.

5. An interrupt management method, comprising:
   holding, independently of an interrupt handler, an interrupt acceptance possibility state that permits an interrupt source to be enabled only when the interrupt source has a higher interrupt level than an interrupt source that is being processed;
   controlling acceptance of a second interrupt source, while a first interrupt source is being processed and independently of the interrupt handler; and
   upon occurrence of an interrupt by the first interrupt source, saving an interrupt mask state in which a mask for the first interrupt source is set to disable said first interrupt source and use of the interrupt acceptance possibility state, and, according to said interrupt acceptance possibility state and an interrupt enabling control, updating the saved interrupt mask state and setting an interrupt mask for the second interrupt source.

6. The interrupt management method according to claim 5, further comprising:
   holding, independently of said interrupt handler, initialization task management information that includes: (a) a call address of a task for performing task initialization processing, (b) execution task information, and (c) initialization task indicating information for indicating whether initialization processing is necessary for a task; and
   judging, based on said execution task control information and said initialization task indicating information, whether or not initialization processing is necessary for a suspended task when returning to said suspended task, and if returning to a suspended task for which initialization processing is necessary, executing a call of the task, stored in said initialization task management information, for performing initialization processing.

7. The interrupt management method according to claim 6, further comprising:
   determining a processing task that is subject to processing;
   performing called processing task switching processing according to the execution task information and the initialization task management information that contain a call address for each processing task;
   performing said switching processing without performing restoration of saved information for a task being executed at the time of interrupt generation;
   judging whether or not suspended task initialization processing is necessary, when returning to a suspended task, based on said execution task processing information and said initialization task management information;

performing said suspended task initialization processing if returning to the task for which initialization processing is necessary; and performing task restoration processing if initialization processing is not necessary.

8. The interrupt management method according to claim 7, further comprising:

performing task initialization control using said initialization task management information; and performing said task switching processing using said execution task processing information.

9. A recording medium on which is recorded a program that executes an interrupt management method, said interrupt management method comprising:

holding, independently of an interrupt handler, an interrupt acceptance possibility state that permits an interrupt source to be enabled only when the interrupt source has a higher interrupt level than an interrupt source that is being processed;

controlling acceptance of a second interrupt source, while a first interrupt source is being processed and independently of the interrupt handler; and upon occurrence of an interrupt by the first interrupt source, saving an interrupt mask state in which a mask for the first interrupt source is set to disable said first interrupt source and use of the interrupt acceptance possibility state, and, according to said interrupt acceptance possibility state and an interrupt enabling control, updating the saved interrupt mask state and setting an interrupt mask for the second interrupt source.

10. An operating system provided with processing functions according to an interrupt management method, said interrupt management method comprising:

holding, independently of an interrupt handler, an interrupt acceptance possibility state that permits an interrupt source to be enabled only when the interrupt source has a higher interrupt level than an interrupt source that is being processed;

controlling acceptance of a second interrupt source, while a first interrupt source is being processed and independently of the interrupt handler; and upon occurrence of an interrupt by the first interrupt source, saving an interrupt mask state in which a mask for the first interrupt source is set to disable said first interrupt source and use of the interrupt acceptance possibility state, and, according to said interrupt acceptance possibility state and an interrupt enabling control, updating the saved interrupt mask state and setting an interrupt mask for the second interrupt source.

11. A signal processing processor provided with processing functions according to an interrupt management method, said interrupt management method comprising:

holding, independently of an interrupt handler, an interrupt acceptance possibility state that permits an interrupt source to be enabled only when the interrupt source has a higher interrupt level than an interrupt source that is being processed;

controlling acceptance of a second interrupt source, while a first interrupt source is being processed and independently of the interrupt handler; and upon occurrence of an interrupt by the first interrupt source, saving an interrupt mask state in which a mask for the first interrupt source is set to disable said first interrupt source and use of the interrupt acceptance possibility state, and, according to said interrupt acceptance possibility state and an interrupt enabling control, updating the saved interrupt mask state and setting an interrupt mask for the second interrupt source.

12. An image terminal apparatus provided with an interrupt management apparatus, said interrupt management apparatus comprising:

an interrupt manager that, independently of an interrupt handler, holds an interrupt acceptance possibility state that permits an interrupt source to be enabled only when the interrupt source has a higher interrupt level than an interrupt source that is being processed;

an interrupt mask canceller that, while a first interrupt source is being processed, controls acceptance of a second interrupt source, independently of the interrupt handler; and a multiple interrupt controller that, upon occurrence of an interrupt by the first interrupt source, saves an interrupt mask state in which a mask for the first interrupt source is set to disable said first interrupt source and the use of the interrupt acceptance possibility state, and that, according to said interrupt acceptance possibility state and a control state of said interrupt mask canceller, updates the saved interrupt mask state and sets an interrupt mask for the second interrupt source.

13. A mobile communication system provided with an image terminal apparatus, said image terminal apparatus having an interrupt management apparatus comprising:

an interrupt manager that, independently of an interrupt handler, holds an interrupt acceptance possibility state that permits an interrupt source to be enabled only when the interrupt source has a higher interrupt level than an interrupt source that is being processed;

an interrupt mask canceller that, while a first interrupt source is being processed, controls acceptance of a second interrupt source, independently of the interrupt handler; and a multiple interrupt controller that, upon occurrence of an interrupt by the first interrupt source, saves an interrupt mask state in which a mask for the first interrupt source is set to disable said first interrupt source and the use of the interrupt acceptance possibility state, and that, according to said interrupt acceptance possibility state and a control state of said interrupt mask canceller, updates the saved interrupt mask state and sets an interrupt mask for the second interrupt source.

* * * * *